United States Patent
Ham et al.

(10) Patent No.: US 9,376,122 B2
(45) Date of Patent: Jun. 28, 2016

(54) UREA SOLUTION AFTER-TREATMENT SYSTEM, AND METHOD AND CONTROLLER FOR WARNING OF UREA SOLUTION STATE USING TOUCH

(71) Applicant: Hyundai Motor Company, Seoul (KR)

(72) Inventors: Chang-Ho Ham, Ansan-si (KR); Eun-Sik Kim, Gwangmyeong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/477,690

(22) Filed: Sep. 4, 2014

(65) Prior Publication Data
US 2015/0322835 A1 Nov. 12, 2015

(30) Foreign Application Priority Data
May 9, 2014 (KR) .................. 10-2014-0055462

(51) Int. Cl.
*F01N 3/08* (2006.01)
*B60W 50/14* (2012.01)
(Continued)

(52) U.S. Cl.
CPC .............. *B60W 50/16* (2013.01); *B60K 26/021* (2013.01); *B60R 16/0232* (2013.01); *F01N 3/0814* (2013.01); *F01N 3/0842* (2013.01); *F01N 2610/02* (2013.01)

(58) Field of Classification Search
CPC . B60W 50/16; B60R 16/0232; B60K 26/021; F01N 3/08; F01N 3/0814; F01N 3/0842; F01N 2610/02
USPC ........................................................ 701/29.2
See application file for complete search history.

(56) References Cited

U.S. PATENT DOCUMENTS 6,363,771 B1 * 4/2002 Liang ................. B01D 53/9431
340/439
8,047,046 B2 * 11/2011 Stark ................... G01F 25/0061
73/1.73

(Continued)

FOREIGN PATENT DOCUMENTS

DE 2555429 A * 6/1977
DE 2714113 A * 10/1978
(Continued)

OTHER PUBLICATIONS

EPO machine translation of DE 2754813 A (original DE document published Jun. 13, 1979).*

*Primary Examiner* — Behrang Badii
*Assistant Examiner* — David Testardi
(74) *Attorney, Agent, or Firm* — Morgan, Lewis & Bockius LLP (57) ABSTRACT

A urea solution after-treatment system may include a controller which receives urea solution detection information of a urea solution storage tank (20) storing a urea solution supplied to an SCR (Selective Catalytic Reduction) (10) for removal of NOx, the controller classifying the urea solution detection information into urea solution state information and then classifying the classified urea solution state information into output signals corresponding thereto, the controller outputting the classified output signals as pattern signals of urea solution shortage, urea solution exhaustion, and urea solution failure, and an accelerator pedal (40) which generates touch recognition patterns varying according to the pattern signals when the pattern signals are input, and transfers the touch recognition patterns using a touch felt by a driver's foot.

22 Claims, 10 Drawing Sheets (51) Int. Cl.
  *B60W 50/16*   (2012.01)
  *B60K 26/02*   (2006.01)
  *B60R 16/023*  (2006.01)

(56) References Cited

U.S. PATENT DOCUMENTS

| | | | | |
|---|---|---|---|---|
| 2007/0163245 A1* | 7/2007 | Sheridan | ............... | F01N 3/2066 60/286 |
| 2010/0050601 A1* | 3/2010 | Nakamura | ............. | B01D 53/90 60/277 |
| 2010/0280740 A1* | 11/2010 | Oe | ......................... | B60K 6/445 701/102 |
| 2011/0132134 A1* | 6/2011 | Kim | ........................ | G05G 1/30 74/514 |
| 2011/0271788 A1* | 11/2011 | Kawai | .................... | F02D 11/02 74/512 |
| 2012/0010786 A1* | 1/2012 | Stickel | ................... | F01N 3/208 701/50 |
| 2012/0132028 A1* | 5/2012 | Kim | ...................... | G05G 1/405 74/512 |
| 2012/0143439 A1* | 6/2012 | Kim | ...................... | B60W 50/16 701/36 |
| 2012/0167708 A1* | 7/2012 | Brandt | ................. | B60K 26/021 74/513 |
| 2012/0304799 A1* | 12/2012 | Noh | ..................... | B60K 26/021 74/512 |
| 2013/0055700 A1* | 3/2013 | Minezawa | ............. | F01N 3/208 60/277 |
| 2013/0116888 A1* | 5/2013 | Kim | ...................... | B60W 50/16 701/36 |
| 2014/0109717 A1* | 4/2014 | Maruyama | ........... | B60K 26/021 74/513 |

FOREIGN PATENT DOCUMENTS

| | | | | |
|---|---|---|---|---|
| DE | 2754813 A | * | 6/1979 | |
| DE | 10026048 A1 | * | 12/2001 | ........... B60K 26/021 |
| JP | 2002-166130 A | | 6/2002 | |
| JP | 2002-169619 A | * | 6/2002 | |
| JP | 2002166130 A | * | 6/2002 | |
| JP | 2012-122386 A | | 6/2012 | |
| JP | 201 21 2719 | * | 7/2012 | |
| JP | 2012-247360 A | | 12/2012 | |
| JP | 201 31 6010 | * | 8/2013 | |
| KR | 10-2010-0061160 A | | 6/2010 | |
| KR | 10-2011-0094060 A | | 8/2011 | |
| WO | WO 2013/087259 A1 | | 6/2013 | |

* cited by examiner

UREA SOLUTION AFTER-TREATMENT SYSTEM, AND METHOD AND CONTROLLER FOR WARNING OF UREA SOLUTION STATE USING TOUCH

CROSS-REFERENCE TO RELATED APPLICATIONS

The present application claims priority to Korean Patent Application No. 10-2014-0055462, filed on May 9, 2014, which is incorporated herein by reference in its entirety.

BACKGROUND OF THE INVENTION

1. Field of the Invention

Exemplary embodiments of the present invention relate to a urea solution after-treatment system, and, particularly, to a urea solution after-treatment system, and a method and controller for warning of a urea solution state using a touch, capable of strongly informing a driver of urea solution shortage, urea solution exhaustion, urea solution failure, etc. from a touch recognition pattern of an accelerator pedal.

2. Description of Related Art

Various methods are applied to reduce NOx contained in exhaust gas of a vehicle. As an example for reduction of NOx, there is an after-treatment technology using a urea solution ($CO(NH_2)_2 + H_2O$).

Such a urea solution after-treatment technology may reduce NOx using $2NO + 2CO$ (or HC) $\rightarrow N_2 + 2CO$ (reaction formula) by which the urea solution is transformed into ammonia ($NH_3$) and then the ammonia selectively reacts with NOx through an SCR catalyst.

To this end, the urea solution after-treatment technology includes a urea solution tank storing ammonia in the form of a urea solution which is harmless to the human body, a selective catalytic reduction (hereinafter, referred to as "SCR"), and an injector for injecting the urea solution into the SCR.

Meanwhile, the urea solution after-treatment technology should meet urea related regulations. As an example, the United States Environmental Protection Agency defines that a vehicle having a non-operational diesel pollution control system fails. In a vehicle equipped with the SCR, the exhaustion of the on-board urea supply is a factor which causes the vehicle to be not driven.

For this reason, the urea solution after-treatment technology further includes a urea solution diagnostic system which allows a vehicle itself to diagnose whether or not a urea solution is insufficient or faulty during driving thereof, and then informs a driver of when the urea solution is abnormal or has trouble, so as not to drive the vehicle.

According to the urea solution after-treatment technology as described above, it may be possible to prevent environmental pollution and an offense against the relevant regulations caused by emission of NOx in exhaust gas without sufficient removal thereof during driving of the vehicle. Particularly, it may be possible to meet Urea-SCR related regulations of North America or Europe by visually informing a driver of urea solution exhaustion and urea solution failure.

However, when a driver merely visually recognizes urea solution exhaustion and urea solution failure, the driver focused on driving of the vehicle has a high possibility of just ignoring a generated urea solution warning message. Moreover, the vehicle may stop against a driver's intention by entering a condition of requiring replenishment of the urea solution, such as full exhaustion of the urea solution or sensing of urea solution failure, in a state in which the driver does not recognize a continuous urea solution warning. The driver, which does not predict such a situation, may feel significantly uncomfortable, resulting in dissatisfaction at the urea solution system. Furthermore, the dissatisfaction at the urea solution system may lead to dissatisfaction at the vehicle.

Particularly, since the BIN #5 exhaust gas regulations of North America require more strictness for a reduction of NOx in exhaust gas, an active measure is required to solve urea solution shortage, urea solution exhaustion, urea solution failure, etc. in the vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a urea solution after-treatment system by which a driver may clearly recognize shortage of a urea solution used to reduce NOx in exhaust gas from a touch recognition pattern of an accelerator pedal, to basically prevent a urea solution problem which does not unintentionally meet the BIN #5 exhaust gas regulations of North America during driving of a vehicle. In particular, the urea solution after-treatment system need not add a separate hardware or change an existing layout by applying an eco pedal which varies pedal effort transferred to a driver for improvement of fuel efficiency.

Another embodiment of the present invention is directed to a method and controller for warning of a urea solution state using a touch in which urea solution shortage, urea solution exhaustion, and urea solution failure may be classified using a touch felt through an accelerator pedal by a driver, thereby clearly providing the driver with a current state of a urea solution. In particular, the method and controller for warning of a urea solution state using a touch may induce a measure of a driver before a vehicle stops against a driver's intention due to an increase in pedal effort of the accelerator pedal during generation of urea solution exhaustion or urea solution failure requiring replenishment of the urea solution.

Other objects and advantages of the present invention can be understood by the following description, and become apparent with reference to the exemplary embodiments of the present invention. Also, it is obvious to those skilled in the art to which the present invention pertains that the objects and advantages of the present invention can be realized by the device as claimed and combinations thereof.

In accordance with an aspect of the present invention, a urea solution after-treatment system may include a controller which receives urea solution detection information of a urea solution storage tank storing a urea solution supplied to an SCR (Selective Catalytic Reduction) for removal of NOx, the controller classifying the urea solution detection information into urea solution state information and then classifying the classified urea solution state information into output signals corresponding thereto, the controller outputting the classified output signals as pattern signals of urea solution shortage, urea solution exhaustion, and urea solution failure, and an accelerator pedal which generates touch recognition patterns varying according to the pattern signals when the pattern signals are input, and transfers the touch recognition patterns using a touch felt by a driver's foot.

The urea solution detection information is configured of the urea solution shortage, the urea solution exhaustion, and the urea solution failure, and the urea solution detection information is detected by a urea solution sensor.

The touch recognition patterns are classified into a urea solution shortage mode, a urea solution warning mode, and a urea solution reinjection mode, the urea solution shortage mode and the urea solution warning mode correspond to the urea solution shortage to transfer the touch as a change in vibration intensity, and the urea solution reinjection mode corresponds to the urea solution exhaustion and the urea solution failure to transfer the touch as a change in pedal effort size.

The vibration intensity is distinguished by further increasing a vibration width of the urea solution warning mode than that of the urea solution shortage mode.

The pedal effort size is larger than that provided by a return spring of the accelerator pedal for the driver.

The urea solution is injected into an exhaust pipe in the front of the SCR by a urea solution injector, and the urea solution injector is connected such that the urea solution is supplied from the urea solution storage tank.

The pattern signals output from the controller are input to a warning portion, and the warning portion visually or acoustically informs the driver of the urea solution shortage, the urea solution exhaustion, and the urea solution failure.

The warning portion is provided in a cluster constituting a vehicle's driver seat.

The controller is a pedal controller for controlling the accelerator pedal.

The accelerator pedal may include a pedal operation portion which generates the touch recognition patterns by the pattern signals output from the controller, and a pedal portion which is operated for vehicle acceleration and transfers the touch recognition patterns using the touch felt by the driver's foot.

The pedal portion may include a pedal pad which is pressed by the driver's foot, and transfers different vibration intensities according to the touch recognition patterns generated by the pedal operation portion using the foot or transfers pedal efforts larger than the pedal effort size of a return spring using the foot.

The pedal operation portion may include an eco motor that generates the touch recognition patterns by linear reciprocating movement of a motor rod interacting with a voice coil to which a current is supplied according to the pattern signals output from the controller.

The current of the eco motor is controlled by a motor controller, and the pattern signals output from the controller are input to the motor controller.

In another aspect of a controller for warning of a urea solution state using a touch, in the present invention, a remaining amount reference of a urea solution is set by indicating a remaining amount of a urea solution analyzed by urea solution detection information detected from a urea solution sensor of a urea solution storage tank as a percentage, when the remaining amount reference of the urea solution is less than a set value of the remaining amount of the urea solution, a first touch recognition pattern corresponding to the remaining amount reference of the urea solution and a second touch recognition pattern corresponding to a urea solution reinjection reference are individually generated, and a vibration width of vibration transferred to a driver pressing a pedal pad is varied by controlling current supply to an eco motor provided in an accelerator pedal using an output signal according to the first touch recognition pattern, but pedal effort transferred to the driver pressing the pedal pad is further increased than a pedal effort size of a return spring by controlling current supply to the eco motor using an output signal according to the second touch recognition pattern.

The controller is a pedal controller for controlling the accelerator pedal.

The accelerator pedal is any one of a pendant type eco organ accelerator pedal, an adjustable eco organ accelerator pedal, and a box type organ accelerator pedal, realizing an eco mode through which the driver feels pedal effort different from that provided by the return spring.

In further another aspect of the present invention, a method for warning of a urea solution state using a touch, may include performing urea solution check of analyzing urea solution detection information of a urea solution storage tank as a remaining amount of a urea solution in a pedal controller, and of setting a remaining amount reference of the urea solution by indicating the remaining amount of the urea solution as a percentage, performing urea solution monitoring of not generating an output signal transferred to an accelerator pedal by the pedal controller when the remaining amount reference of the urea solution is greater than a set value of the remaining amount of the urea solution, performing urea solution warning of, when the remaining amount reference of the urea solution is less than the set value of the remaining amount of the urea solution, individually generating a first touch recognition pattern corresponding to the remaining amount reference of the urea solution and a second touch recognition pattern corresponding to a urea solution reinjection reference by the pedal controller, and then of generating an output signal transferred to the accelerator pedal, and performing a driver's recognition in which the driver recognizes a urea solution shortage state by transferring vibration generated by the accelerator pedal to the driver's foot through the first touch recognition pattern, and the driver recognizes a urea solution reinjection state by transferring pedal effort generated by the accelerator pedal to the driver's foot through the second touch recognition pattern.

At the performing of the urea solution check, the remaining amount reference of the urea solution is a remaining amount of the urea solution <5%, and the urea solution detection information is updated at 1 minute interval.

At the performing of the urea solution warning, the first touch recognition pattern is classified into a urea solution shortage mode and a urea solution warning mode, and a classification of the urea solution shortage mode and the urea solution warning mode is performed within a range of 0%<the remaining amount of the urea solution <5%, and the urea solution reinjection reference is the remaining amount of the urea solution=0% or urea solution failure.

At the performing of the driver's recognition, the recognition of the urea solution shortage state is performed such that the first touch recognition pattern is classified into a urea solution shortage mode and a urea solution warning mode within a range of 0%<the remaining amount of the urea solution <5%, and is performed by differing a vibration width of the urea solution shortage mode from that of the urea solution warning mode.

A size of the vibration width is changed by applying vibration width=(10−the remaining amount of the urea solution %)*vibration time.

At the performing of the driver's recognition, the recognition of the urea solution reinjection state is performed such that the size of the pedal effort is increased as the pedal effort is gradually increased over time, and the size of the pedal effort is changed on the basis of 1.0 kgf.

At the performing of the driver's recognition, the recognition of the urea solution shortage state and the recognition of the urea solution reinjection state are visually or acoustically provided for the driver through a cluster forming the driver's seat.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention will be described below in more detail with reference to the accompanying drawings. The present invention may, however, be embodied in different forms and should not be construed as limited to the exemplary embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention. The drawings are not necessarily to scale and in some instances, proportions may have been exaggerated in order to clearly illustrate features of the exemplary embodiments.

Figure 1:
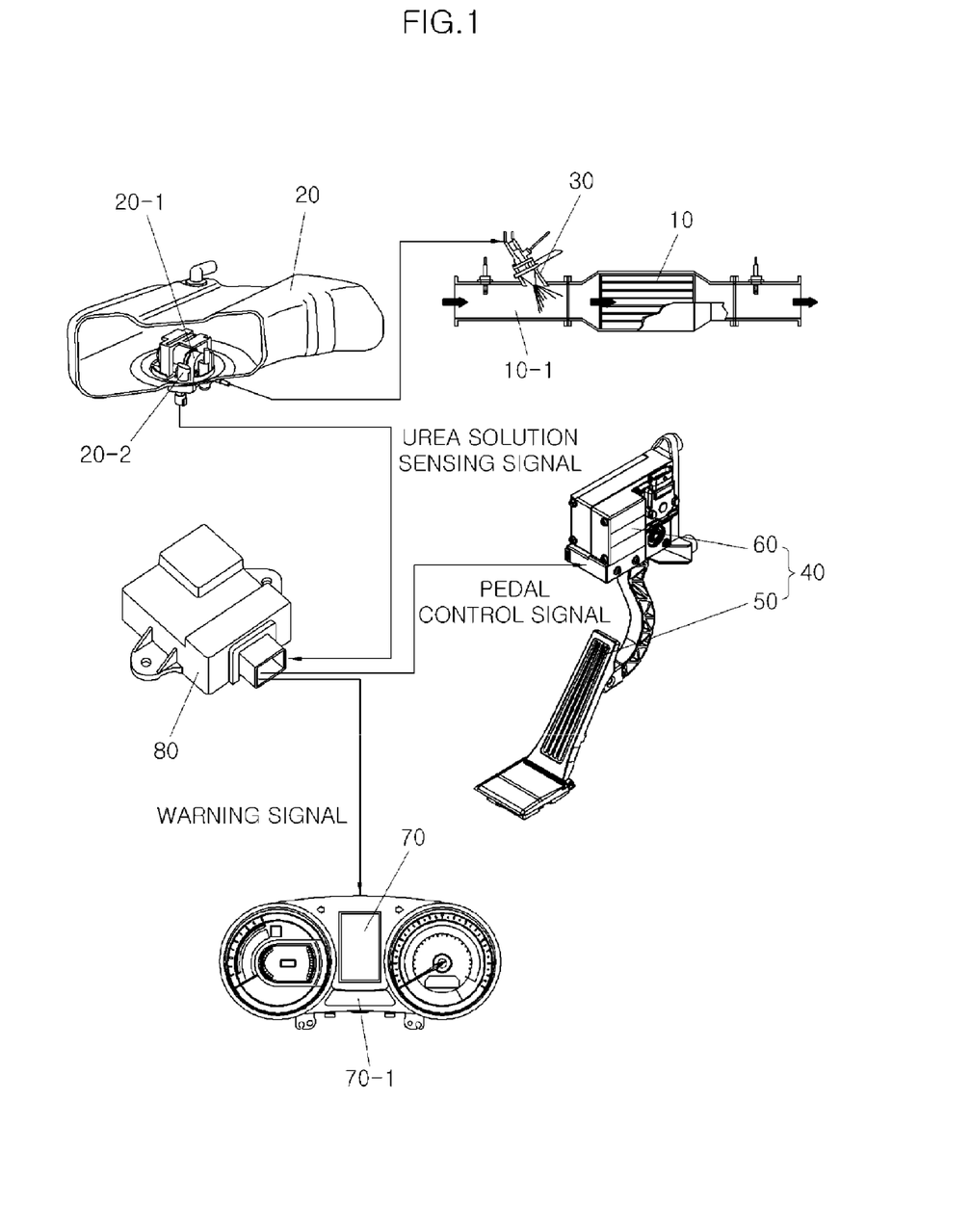
FIG. 1 is a view illustrating a configuration of a urea solution after-treatment system according to an exemplary embodiment of the present invention.

FIG. 1 is a view illustrating a configuration of a urea solution after-treatment system according to an exemplary embodiment of the present invention.

As shown in the drawing, the urea solution after-treatment system includes a selective catalytic reduction 10 (hereinafter, referred to as "SCR") for removal of NOx in exhaust gas, a urea solution storage tank 20 for storing a urea solution, a urea solution injector 30 for injecting the urea solution, an accelerator pedal 40 which is pressed and operated by a driver to adjust a throttle opening degree and realizes various touch recognition patterns based on state information of the urea solution, a warning portion 70 for warning the driver based on the state information of the urea solution, a pedal controller 80 which generates output signals for controlling the accelerator pedal 40 and the warning portion 70 based on the state information of the urea solution.

The SCR 10 is installed on an exhaust pipe 10-1, and removes NOx in exhaust gas using $2NO+2CO$ (or $HC$)->$N_2$+$2CO$ (reaction formula) by which the urea solution injected into the exhaust pipe 10-1 is transformed.

The urea solution storage tank 20 includes a urea solution pump 20-1 which pumps the stored urea solution to supply the urea solution to the urea solution injector 30, and a urea solution sensor 20-2 which detects a remaining amount of the stored urea solution to transfer the urea solution to the pedal controller 80.

The urea solution injector 30 is installed on the exhaust pipe 10-1 in the front of the SCR 10, and injects the pumped urea solution by the urea solution pump 20-1 into the exhaust pipe 10-1.

The accelerator pedal 40 includes a pedal portion 50 which is pressed and operated by the driver to adjust a throttle opening degree, and a pedal operation portion 60 which generates various touch recognition patterns such that the driver feels the touch recognition patterns by a touch of the driver's foot through the pedal portion 50. The touch recognition patterns are based on the state information of the urea solution stored in the urea solution storage tank 20, and the state information of the urea solution is classified into urea solution shortage, urea solution exhaustion, and urea solution failure.

The warning portion 70 is provided in a cluster 70-1, and warns the driver of a serious level to which the state information of the urea solution stored in the urea solution storage tank 20 affects driving of the vehicle, together with a visual or auditory message.

The pedal controller 80 individually classifies urea solution shortage, urea solution exhaustion, and urea solution failure through the state information of the urea solution transferred from the urea solution sensor 20-2 of the urea solution storage tank 20, and varies the touch recognition patterns of the accelerator pedal 40 according to the classified state information of the urea solution or outputs the visual or auditory message of the warning portion 70.

However, the pedal controller 80 may be an ECU (Electronic Control Unit) for performing engine control, or any controller which receives signals from the urea solution sensor 20-2 and generates output signals classified according to the classified state information of the urea solution.

Figure 2:
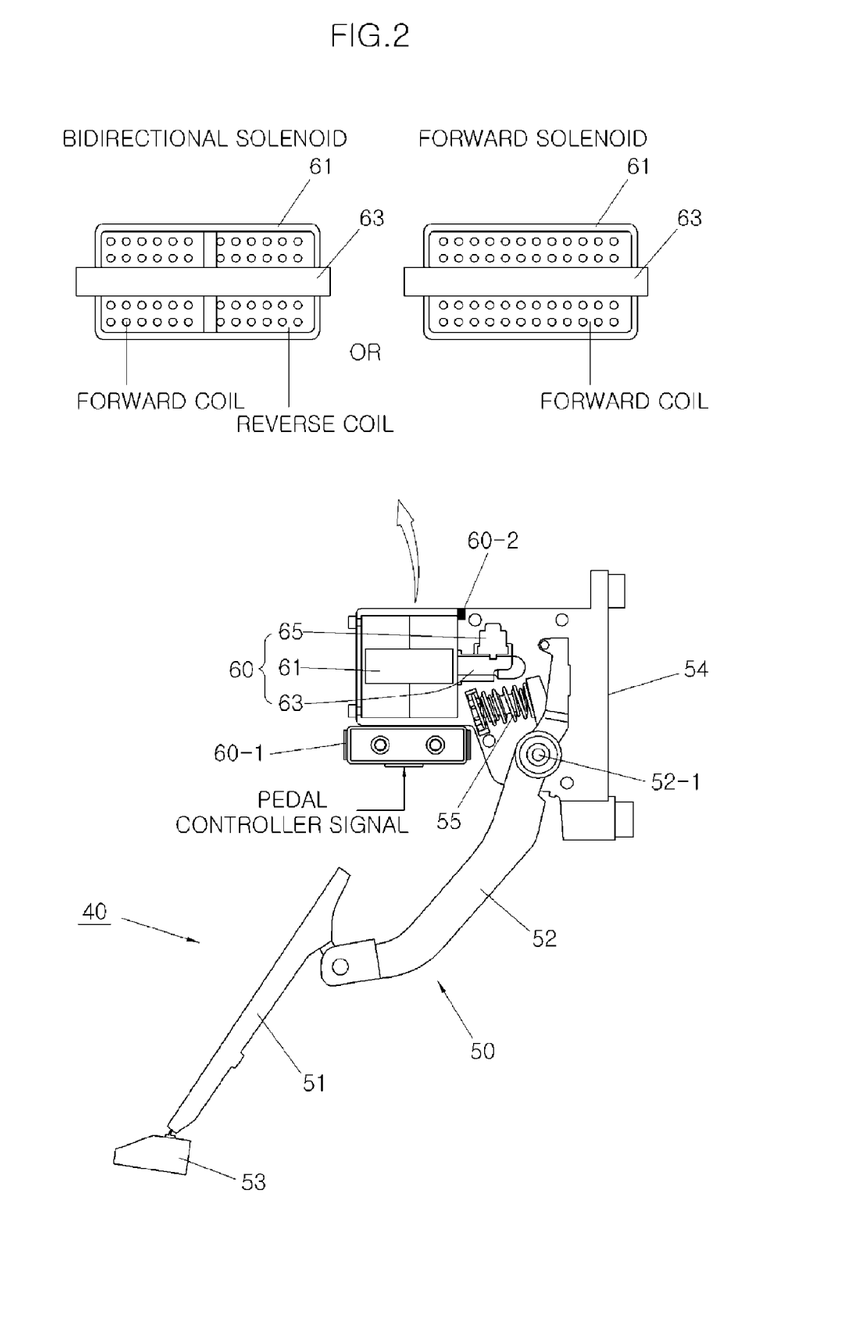
FIG. 2 is a view illustrating an example of a pendant type eco organ accelerator pedal applied to the urea solution after-treatment system according to the exemplary embodiment of the present invention.
Figure 3:
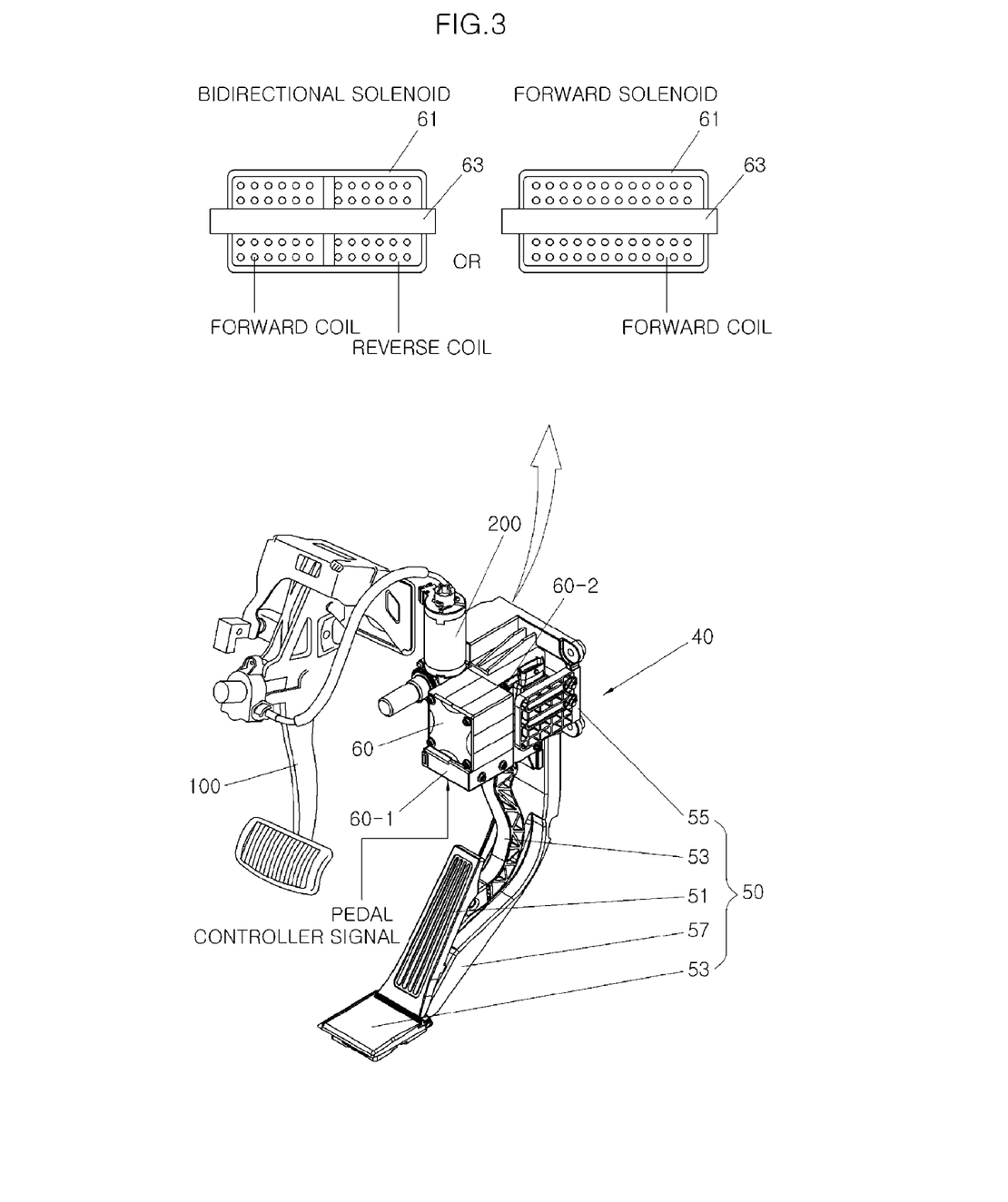
FIG. 3 is a view illustrating an example of an adjustable eco organ accelerator pedal applied to the urea solution after-treatment system according to the exemplary embodiment of the present invention.

Meanwhile, FIGS. 2 and 3 are views illustrating a type of the accelerator pedal applied to the exemplary embodiment of the present invention. Although a pendant type eco organ accelerator pedal (pedal type 1) and an adjustable eco organ accelerator pedal (pedal type 2) are shown in the drawings, the present invention is not limited thereto. For example, since a box type organ accelerator pedal may also realize an eco mode similarly to the above pedals, the pedal may be expanded as all types of accelerator pedals realizing the eco mode, but is not limited to a particular name of the pedal. In particular, a typical accelerator pedal may be expanded to be used as a urea solution recognition pedal such as the accelerator pedal 40 of the present invention by only a simple change of adding a VCM motor for vibration generation to the typical accelerator pedal.

FIG. 2 shows that the accelerator pedal 40 is a pendant type eco organ accelerator pedal (pedal type 1). Such an accelerator pedal realizes an eco mode for reducing fuel efficiency by suppressing unnecessary acceleration by allowing the driver to feel pedal effort different from that provided by a return spring during constant speed driving.

Specifically, the accelerator pedal 40 includes the pedal portion 50 which is pressed and operated by the driver, and the pedal operation portion 60 which operates the pedal portion 50 such that the driver feels the touch recognition patterns together with the eco mode by a touch of the driver's foot through the pedal portion 50.

The pedal portion 50 includes a pedal pad 51 on which the driver's foot is put, a pedal arm 52 which rotates about a hinge shaft 52-1 coupled to a pedal housing 54 during pressing of the pedal pad 51, a lower bracket 53 coupled to lower portion of the pedal pad 51, and a pedal effort spring 55 which elastically supports an upper portion of the pedal arm 52 in the pedal housing 54 to generate pedal effort. In this case, the pedal pad 51, the pedal arm 52, the hinge shaft 52-1, the lower bracket 53, the pedal housing 54, and the pedal effort spring 55 are the same components as those of a pedal portion constituting a typical pendant type eco organ accelerator pedal.

The pedal operation portion 60 includes an eco motor 61 which is supplied with a current, a motor rod 63 which repeatedly presses the upper portion of the pedal arm 52 by generating axially linear reciprocating movement of the eco motor 61 during operation of the eco motor 61, a rod positioner 65 which takes a position of the motor rod 63 within the pedal housing 54, a motor controller 60-1 which controls current supply to the eco motor 61, and a hall sensor type motor sensor 60-2 which detects a withdrawn position of the motor rod 63.

The eco motor 61 is a VCM (Voice Coil Motor). A voice coil enclosing the motor rod 63 may be configured of a type (referred to as a bidirectional solenoid) having both of a forward coil and a reverse coil to control force by coil current adjustment of each thereof, or may be configured of a type (referred to as a forward solenoid) having only a unidirectional coil such as a forward coil to control force transferred in a direction opposite to operation of the pedal.

The motor rod 63 may be formed with an inclined groove into which the rod positioner 65 may be inserted, to be fixed at an initial position. The rod positioner 65 is elastically supported by a spring and includes a rod pin located at the groove of the motor rod 63.

The motor controller 60-1 is connected to the pedal controller 80 to control current supply to the eco motor 61. The motor sensor 60-2 is installed within the pedal housing 54 to detect a withdrawn position of the motor rod 63.

In this case, the eco motor 61, the motor rod 63, the rod positioner 65, the motor controller 60-1, and the motor sensor 60-2 are the same components as those of a pedal operation portion constituting an eco mode in a typical pendant type eco organ accelerator pedal. However, the motor controller 60-1 further includes control by the pedal controller 80 to realize the touch recognition pattern of the present invention.

On the other hand, FIG. 3 shows that the accelerator pedal 40 is an adjustable eco organ accelerator pedal (pedal type 2). Such an accelerator pedal realizes an eco mode for reducing fuel efficiency by suppressing unnecessary acceleration by allowing the driver to feel pedal effort different from that provided by a return spring during constant speed driving, and also provides convenience that a pedal distance is adapted for the driver.

However, the adjustable eco organ accelerator pedal further includes a configuration for pedal distance adjustment which is not realized by the pendant type eco organ accelerator pedal. To this end, a lower bracket 53 of a pedal portion 50 of the adjustable eco organ accelerator pedal, adopts a configuration in which a pedal pad 51 may slidably move, and a lower support portion 57 coupled to a pedal housing 54 is fixed to the lower bracket 53. Accordingly, the pedal portion 50 and pedal operation portion 60 of the adjustable eco organ accelerator pedal are the same as those of the pendant type eco organ accelerator pedal, except for the above configuration.

In addition, the adjustable eco organ accelerator pedal differs from the pendant type eco organ accelerator pedal in that an adjustable brake pedal 100 is connected to an adjustable motor 200 by a driving cable. Therefore, in the adjustable eco organ accelerator pedal, the pedal pad 51 of the pedal portion 50 and the adjustable brake pedal 100 enable distance adjustment for the driver.

Figure 4:
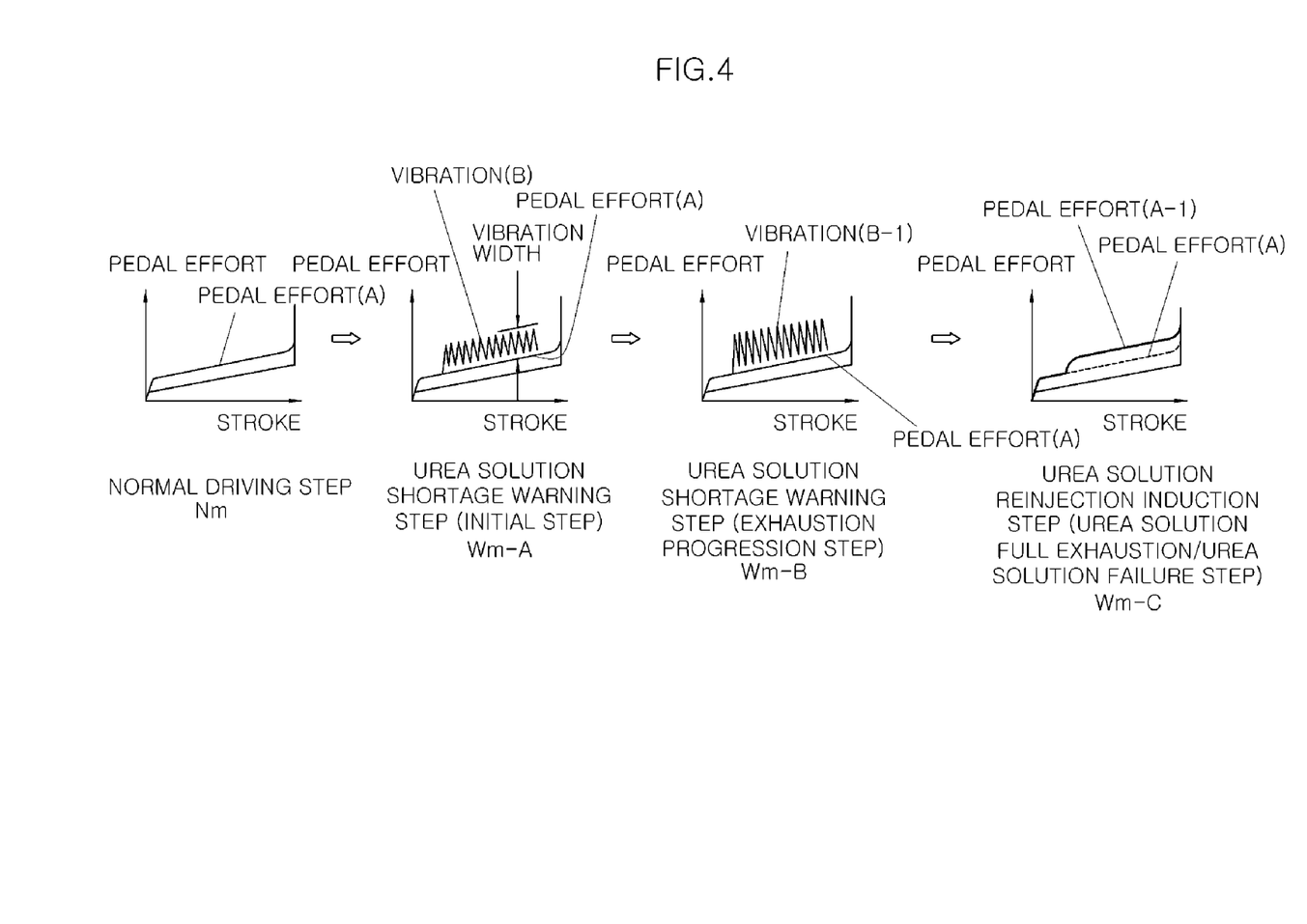
FIG. 4 is a view illustrating an example of various touch recognition patterns which are transferred from the pendant type eco organ accelerator pedal or adjustable eco organ accelerator pedal for the urea solution after-treatment system to a driver's foot according to the exemplary embodiment of the present invention.

Meanwhile, FIG. 4 shows an example of various touch recognition patterns transferred to the driver's foot when the accelerator pedal 40 of the present invention is the pendant type eco organ accelerator pedal (pedal type 1) or the adjustable eco organ accelerator pedal (pedal type 2).

As shown in the drawing, the touch recognition patterns are classified into a normal driving mode Nm, a urea solution shortage mode Wm-A, a urea solution warning mode Wm-B, and a urea solution reinjection mode Wm-C. In this case, since the touch recognition pattern is realized unlike the eco mode, the driver may distinguish the eco mode and the touch recognition pattern and such a difference is realized by an operation state of the pedal operation portion 60 using logic. However, since the eco mode is already known, no description will be given thereof in an exemplary embodiment of the present invention.

Specifically, the normal driving mode Nm device that pedal effort is increased through the return spring in proportion to a pedal stroke increased during the pedal operation of the driver. Therefore, the normal driving mode Nm device a general operation state of the accelerator pedal.

The urea solution shortage mode Wm-A and the urea solution warning mode Wm-B are a vibration state in which touch recognition of the driver is formed through vibration, and the urea solution warning mode Wm-B has a relatively strong vibration intensity compared to that of the urea solution shortage mode Wm-A. Therefore, the driver feeling vibration of the urea solution shortage mode Wm-A may recognize a state in which the urea solution is currently lack, but the driver feeling vibration of the urea solution warning mode Wm-B may recognize a state in which the urea solution is gradually exhausted.

The urea solution reinjection mode Wm-C device a pedal effort increase state in which touch recognition of the driver is formed through pedal effort. In this case, the urea solution reinjection mode Wm-C has a relatively significantly increased pedal effort intensity compared to that of the normal driving mode Nm, so that the pedal is not easily pressed. Therefore, the driver may recognize an injection state due to urea solution exhaustion or urea solution failure.

Figure 5A:
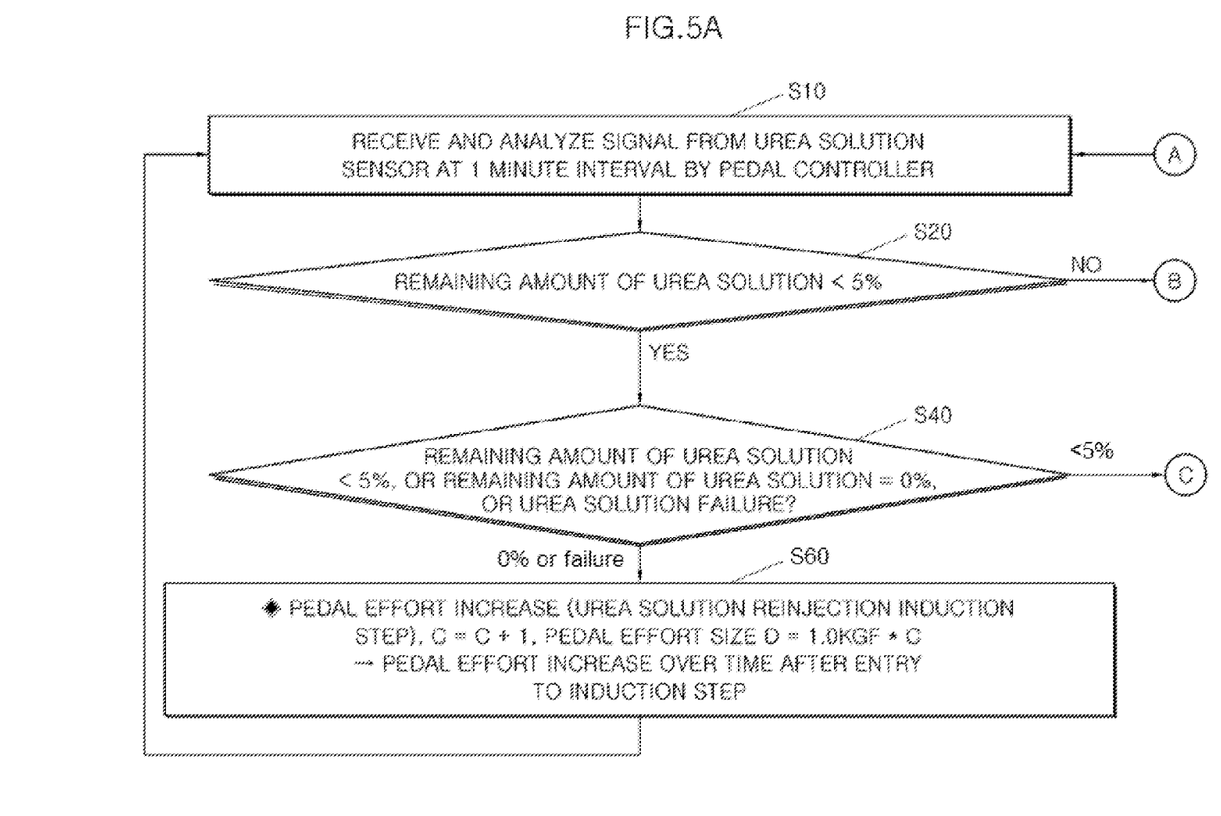
FIGS. 5A and 5B are flowcharts illustrating a method for warning of a urea solution state using a touch according to the exemplary embodiment of the present invention.
Figure 5B:
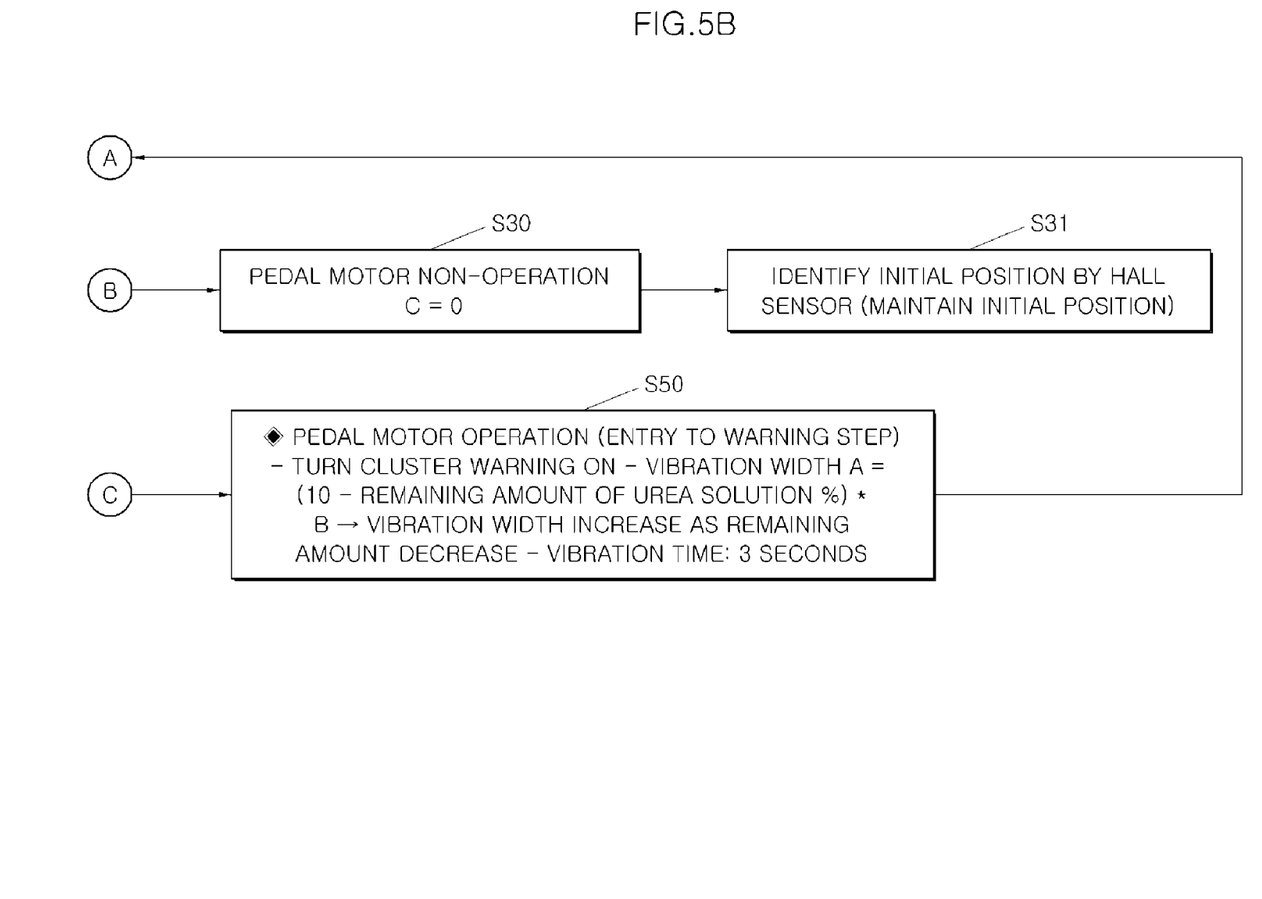

Meanwhile, FIGS. 5A and 5B are embodiments illustrating a method for warning of a urea solution state using a touch according to an exemplary embodiment of the present invention. FIGS. 6A, 6B, 7A, and 7B show operation of the urea solution after-treatment system according to the urea solution state.

Reference numeral S10 refers to a step of analyzing urea solution detection information using signals of the urea solution sensor 20-2. This is performed in such a way that the pedal controller 80 receives signals of the urea solution sensor 20-2 and determines a remaining amount of the urea solution from the received urea solution detection information. In this case, the pedal controller 80 receives and analyzes the signals at about 1 minute interval. However, the interval may become shorter or longer according to a capacity of the urea solution storage tank 20 as occasion demands.

In the present embodiment, the remaining amount of the urea solution is indicated as a percentage, and a remaining amount reference of the urea solution is set by applying about 5% on the basis of 100%.

Reference numeral S20 refers to a step of determining whether need to inform the driver of a urea solution state. To this end, the pedal controller 80 applies the remaining amount reference of the urea solution as a remaining amount of the urea solution <5% and then generates an output signal based on the result.

As a check result at step S20, when it is not a remaining amount of the urea solution <5%, the pedal controller 80 does not generate an output signal such as at step S30. Thus, the pedal motor (eco motor 61) of the accelerator pedal 40 maintains a non-operation state and then an initial state of the pedal motor (eco motor 61) is maintained such as at step S31. In this case, the initial state of the pedal motor (eco motor 61) is maintained by the motor controller 60-2 receiving a detection signal of the hall sensor type motor sensor 60-2.

On the other hand, as a check result at step S20, when it is a remaining amount of the urea solution <5%, the pedal controller 80 determines detailed urea solution information again at step S40, and then an output signal based on the result is transferred to the accelerator pedal 40.

For example, the pedal controller 80 classifies a remaining amount of the urea solution <5%, a remaining amount of the urea solution=0%, and urea solution failure. When it is a remaining amount of the urea solution <5%, the pedal controller 80 outputs a pattern signal indicative of urea solution shortage. When it is a remaining amount of the urea solution=0%, the pedal controller 80 outputs a pattern signal indicative of urea solution reinjection due to urea solution exhaustion. When it is urea solution failure, the pedal controller 80 outputs a pattern signal indicative of urea solution reinjection due to urea solution unusable status. Here, the pattern signals according to a remaining amount of the urea solution=0% and urea solution failure are equal to each other.

The output pattern signals are input to the accelerator pedal 40, and accelerator pedal 40 generates touch recognition patterns corresponding to the output pattern signals so that the driver recognizes a urea solution state by a touch through one's foot which is put on the accelerator pedal 40. Here, the touch recognition patterns refer to a urea solution shortage mode Wm-A and a urea solution warning mode Wm-B corresponding to urea solution shortage, which are defined as a first touch recognition pattern. In addition, the touch recognition pattern refers to a urea solution reinjection mode Wm-C corresponding to urea solution exhaustion and urea solution failure, which is defined as a second touch recognition pattern.

At step S50, when it is a remaining amount of the urea solution <5% as a check result at step S40, the pedal controller 80 outputs pattern signals of the urea solution shortage mode Wm-A and urea solution warning mode Wm-B corresponding to urea solution shortage. An operation state of the urea solution after-treatment system is illustratively shown in FIGS. 6A and 6B.

Figure 6A:
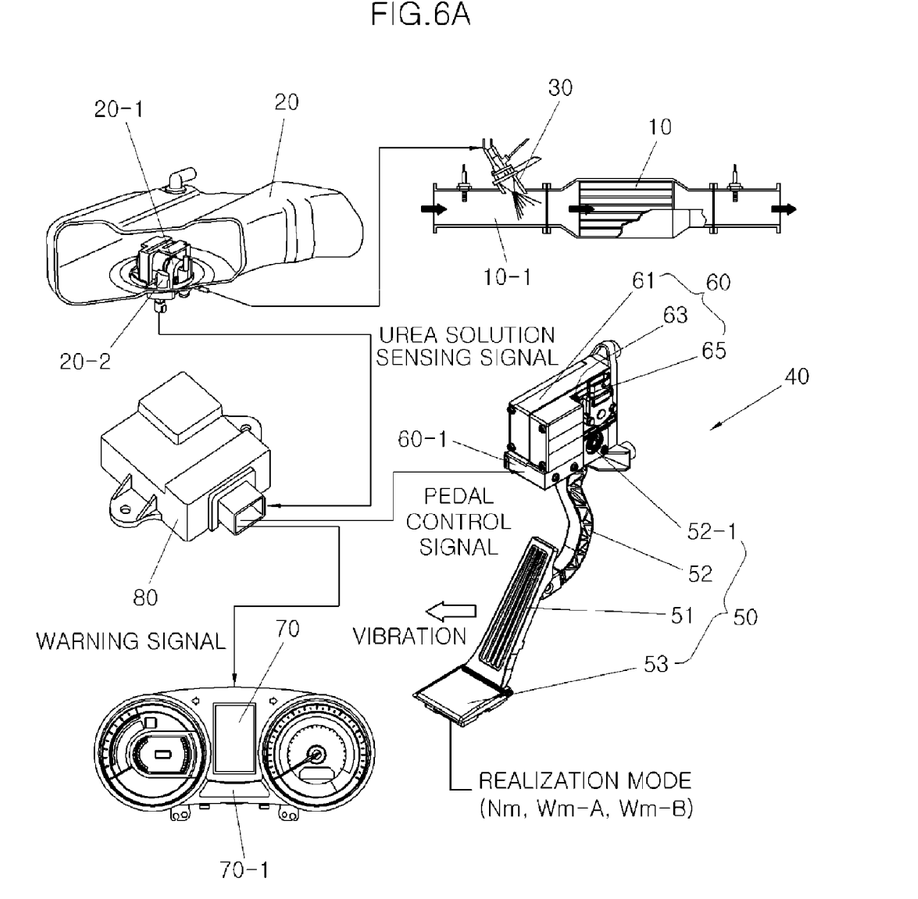
FIGS. 6A and 6B are views illustrating a state in which the urea solution after-treatment system realizes a urea solution shortage warning by device of using the pendant type eco organ accelerator pedal according to the exemplary embodiment of the present invention.
Figure 6B:
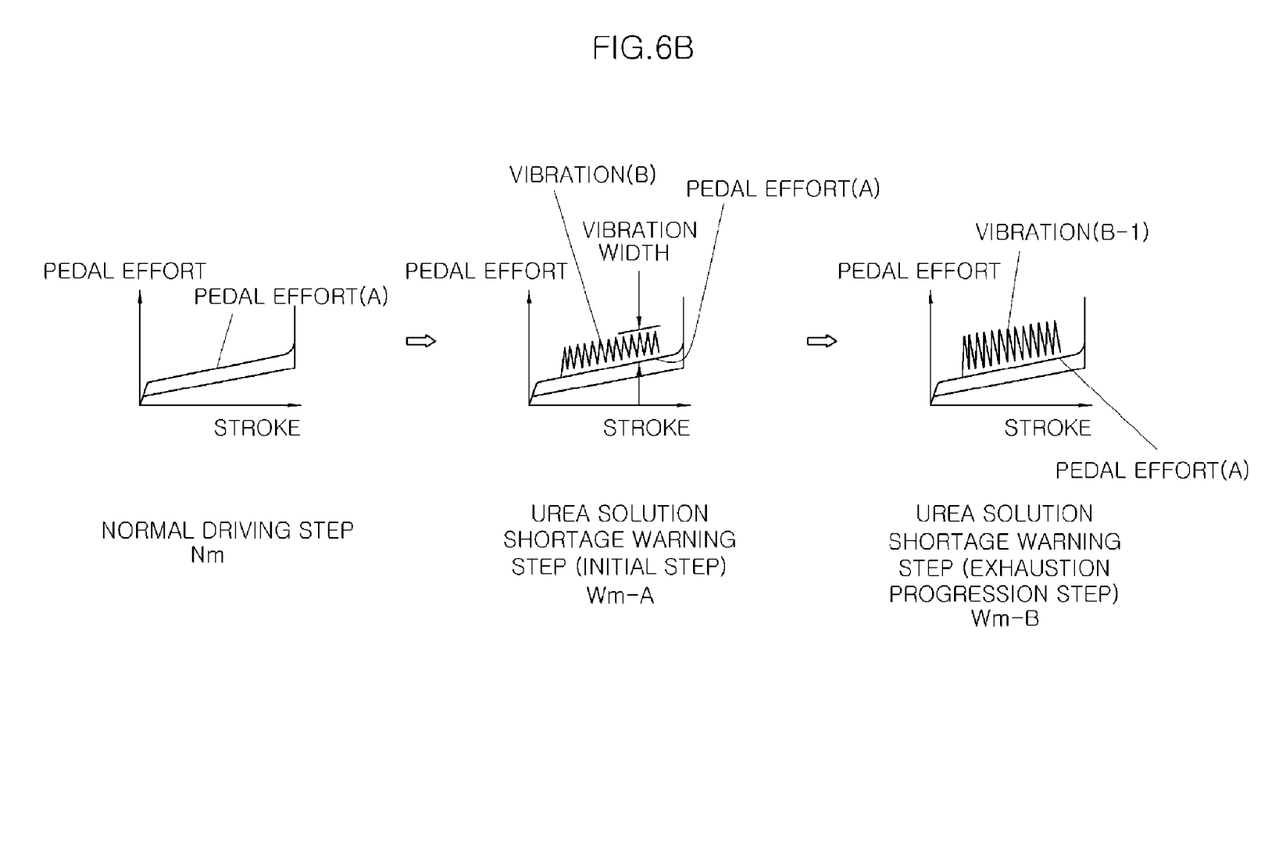

Specifically, the accelerator pedal 40 is operated by the pattern signal output from the pedal controller 80, and the driver may recognize a current state of urea solution shortage by the touch recognition pattern generated by the accelerator pedal 40. In this case, the touch recognition pattern is transferred to the driver as a vibration intensity. Particularly, the urea solution warning mode Wm-B has a larger vibration width than the urea solution shortage mode Wm-A, so that the driver may grasp a level of urea solution shortage by vibration intensities different between the urea solution shortage mode Wm-A and the urea solution warning mode Wm-B. For example, the vibration width is increased as the remaining amount of the urea solution is decreased by applying vibration width=(10−remaining amount of urea solution %)*vibration time, and the vibration time may be about 3 seconds. In this case, the urea solution shortage mode Wm-A may be defined by 2%<remaining amount of urea solution <5%, and the urea solution warning mode Wm-B may be defined by 0%<remaining amount of urea solution <2%.

In addition, at step S50, the warning portion 70 provided in the cluster 70-1 is turned on by the pattern signal output from the pedal controller 80, so that the driver may visually recognize the warning by a warning message provided on the warning portion 70 or may acoustically recognize the warning by an audio message provided on the warning portion 70.

On the other hand, at step S60, when it is a remaining amount of the urea solution=0% or urea solution failure as a check result at step S40, the pedal controller 80 outputs a pattern signal of the urea solution reinjection mode Wm-C corresponding to urea solution exhaustion and urea solution failure. An operation state of the urea solution after-treatment system is illustratively shown in FIGS. 7A and 7B.

Figure 7A:
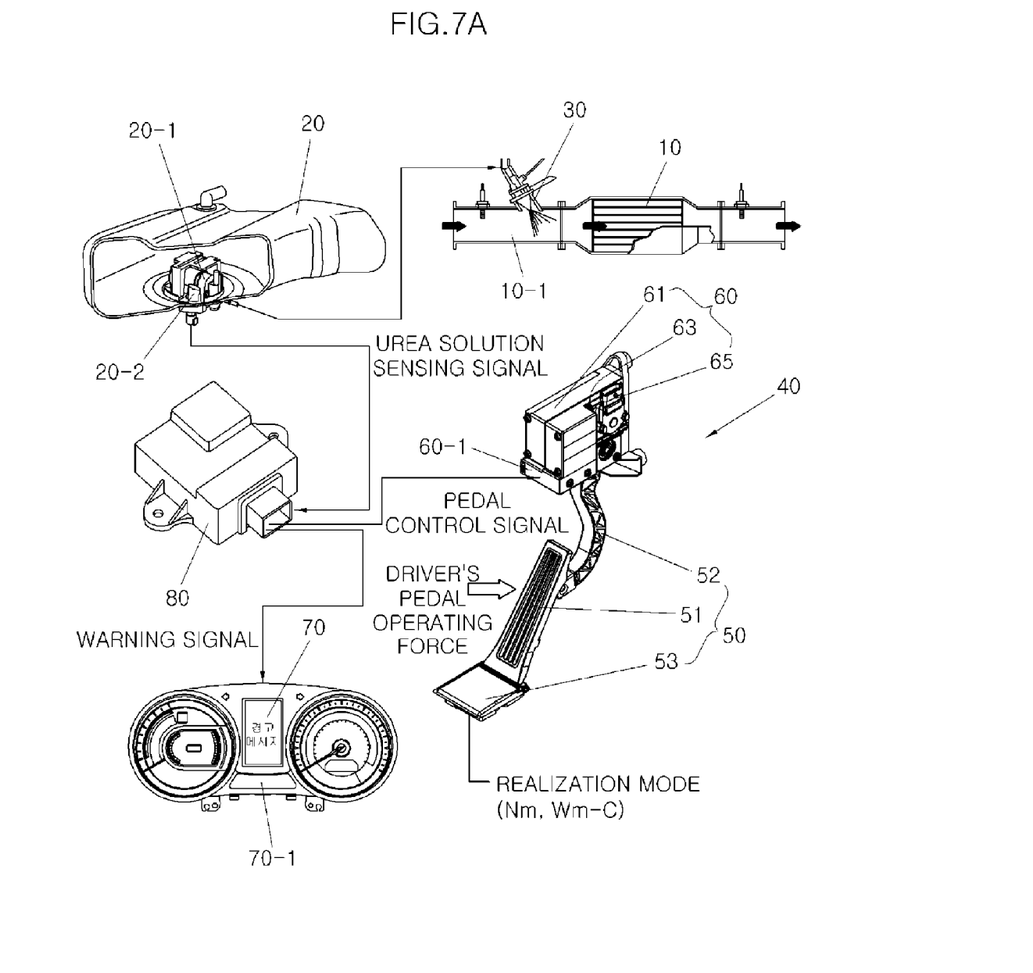
FIGS. 7A and 7B are views illustrating a state in which the urea solution after-treatment system realizes a urea solution exhaustion or urea solution failure warning by device of using the pendant type eco organ accelerator pedal according to the exemplary embodiment of the present invention.
Figure 7B:
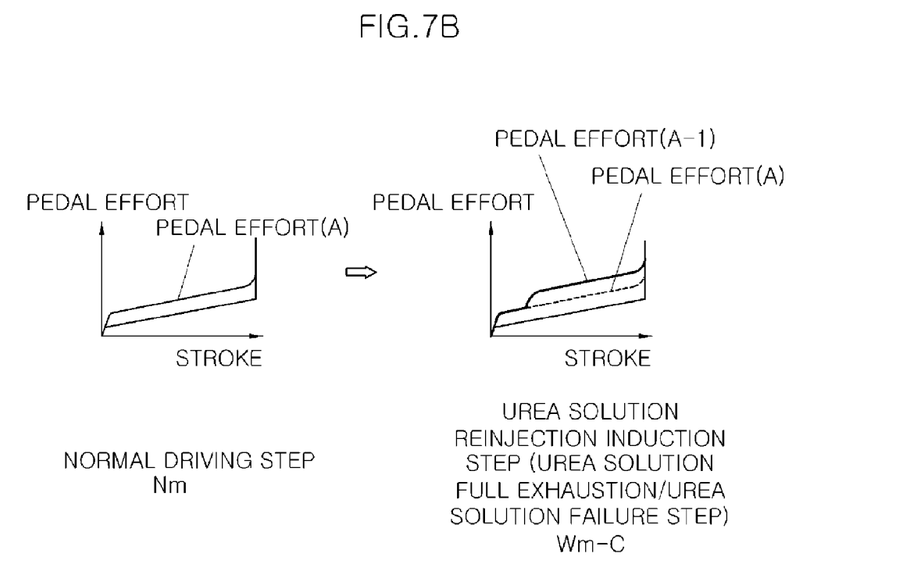

Specifically, the accelerator pedal 40 is operated by the pattern signal output from the pedal controller 80, and the driver may recognize a current state of urea solution reinjection by the touch recognition pattern generated by the accelerator pedal 40. In this case, the touch recognition pattern is transferred to the driver as a warning pedal effort size, and the warning pedal effort size is larger than the pedal effort provided by the return spring in the normal driving mode Nm. For example, the pedal effort may be increased over time after entry to the induction step by applying the warning pedal effort size is increased as the remaining amount of the urea solution is decreased by applying warning pedal effort size= (1.0 kgf*induction time).

In addition, at step S50, the warning portion 70 provided in the cluster 70-1 is turned on by the pattern signal output from the pedal controller 80, so that the driver may visually recognize the warning by a warning message provided on the warning portion 70 or may acoustically recognize the warning by an audio message provided on the warning portion 70.

As describe above, the urea solution after-treatment system according to the present embodiment includes the pedal controller 80 to which the pattern signals classifying the urea solution detection information detected from the urea solution storage tank 20 into the urea solution shortage, the urea solution exhaustion, and the urea solution failure are output, and the accelerator pedal 40 which generates the touch recognition patterns varying according to the pattern signals so that the touch recognition patterns are transferred using the touch felt by the driver's foot. It may be possible to inform the driver of a urea solution shortage state corresponding to a remaining amount reference of a urea solution by the vibration of the accelerator pedal 40 based on the urea solution detection information of the urea solution storage tank 20 in the pedal controller 80. In addition, it may be possible to inform the driver of a urea solution reinjection state such as the urea solution exhaustion or the urea solution failure by the pedal effort increase of the accelerator pedal 40, thereby clearly providing the driver with a current state of the urea solution. Particularly, it may be possible to induce a measure of the driver before the vehicle stops against a driver's intention when the urea solution reinjection is required.

As is apparent from the above description, the present invention may strongly inform a driver of a current state of a urea solution in a urea solution after-treatment system by a touch through a driver's foot pressing an accelerator pedal, thereby preventing an unrecognized problem of urea solution shortage by the driver during driving of a vehicle. Particularly, the present invention may basically prevent a urea solution problem which does not unintentionally meet the BIN #5 exhaust gas regulations of North America during driving of the vehicle.

In addition, the present invention enables urea solution shortage, urea solution exhaustion, and urea solution failure to be classified using the touch felt through the accelerator pedal by the driver, thereby clearly providing the driver with a current state of the urea solution. Particularly, the present invention may allow the driver to cope with a situation by accurately recognizing a current state of the urea solution.

In addition, the present invention may allow the driver to gradually recognize progression from urea solution shortage to urea solution exhaustion. Particularly, the present invention may induce a measure of the driver before the vehicle stops against a driver's intention due to an increase in pedal effort of the accelerator pedal during generation of urea solution exhaustion or urea solution failure requiring replenishment of the urea solution.

In addition, the present invention may increase urea solution warning recognition of the driver by a visual or auditory message realized through a cluster at the time of warning of urea solution shortage, urea solution exhaustion, urea solution replenishment, urea solution failure, etc.

In addition, the present invention need not add a separate hardware or change an existing layout for recognition of a urea solution state by transferring urea solution state information to the driver using a touch recognition pattern of the accelerator pedal.

In addition, the present invention may expand all types of eco pedals realizing vibration patterns such that the eco pedals are suitable to be used as a urea solution recognition pedal by only a simple logic by transferring urea solution state information to the driver using various touch recognition patterns of the accelerator pedal. Particularly, a typical accelerator pedal may be expanded to be used as a urea solution recognition pedal by only a simple change of adding a VCM motor for vibration generation to the typical accelerator pedal.

While the present invention has been described with respect to the specific embodiments, it will be apparent to those skilled in the art that various changes and modifications may be made without departing from the spirit and scope of the invention as defined in the following claims.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A urea solution after-treatment system comprising:
   a controller which receives urea solution detection information of a urea solution storage tank storing a urea solution supplied to an SCR (Selective Catalytic Reduction) for removal of NOx, the controller classifying the urea solution detection information into urea solution state information and then classifying the classified urea solution state information into output signals corresponding thereto, the controller outputting the classified output signals as pattern signals of urea solution shortage, urea solution exhaustion, and urea solution failure; and
   an accelerator pedal which generates touch recognition patterns varying according to the pattern signals when the pattern signals are input, and transfers the touch recognition patterns using a touch felt by a driver's foot,
   wherein the touch recognition patterns are classified into a urea solution shortage mode, a urea solution warning mode, and a urea solution reinjection mode, the urea solution shortage mode and the urea solution warning mode correspond to the urea solution shortage to transfer the touch as a change in vibration intensity, and the urea solution reinjection mode corresponds to the urea solution exhaustion and the urea solution failure to transfer the touch as a change in pedal effort size.

2. The urea solution after-treatment system of claim 1, wherein the urea solution detection information is configured of the urea solution shortage, the urea solution exhaustion, and the urea solution failure, and the urea solution detection information is detected by a urea solution sensor.

3. The urea solution after-treatment system of claim 1, wherein the vibration intensity is distinguished by further increasing a vibration width of the urea solution warning mode than that of the urea solution shortage mode.

4. The urea solution after-treatment system of claim 1, wherein the pedal effort size is larger than that provided by a return spring of the accelerator pedal for the driver.

5. The urea solution after-treatment system of claim 1, wherein the urea solution is injected into an exhaust pipe in the front of the SCR by a urea solution injector, and the urea solution injector is connected such that the urea solution is supplied from the urea solution storage tank.

6. The urea solution after-treatment system of claim 1, wherein the pattern signals output from the controller are input to a warning portion, and the warning portion visually or acoustically informs the driver of the urea solution shortage, the urea solution exhaustion, and the urea solution failure.

7. The urea solution after-treatment system of claim 6, wherein the warning portion is provided in a cluster constituted in a vehicle's driver seat.

8. The urea solution after-treatment system of claim 1, wherein the controller is a pedal controller for controlling the accelerator pedal.

9. The urea solution after-treatment system of claim 1, wherein the accelerator pedal comprises a pedal operation portion which generates the touch recognition patterns by the pattern signals output from the controller, and a pedal portion which is operated for vehicle acceleration and transfers the touch recognition patterns using the touch felt by the driver's foot.

10. The urea solution after-treatment system of claim 9, wherein the pedal portion comprises a pedal pad which is pressed by the driver's foot, and transfers different vibration intensities according to the touch recognition patterns generated by the pedal operation portion using the foot or transfers pedal efforts larger than the pedal effort size of a return spring using the foot.

11. The urea solution after-treatment system of claim 9, wherein the pedal operation portion comprises an eco motor that generates the touch recognition patterns by linear reciprocating movement of a motor rod interacting with a voice coil to which a current is supplied according to the pattern signals output from the controller.

12. The urea solution after-treatment system of claim 11, wherein the current of the eco motor is controlled by a motor controller, and the pattern signals output from the controller are input to the motor controller.

13. A controller for warning of a urea solution state using a touch, wherein:
a remaining amount reference of a urea solution is set by indicating a remaining amount of a urea solution analyzed by urea solution detection information detected from a urea solution sensor of a urea solution storage tank as a percentage;
when the remaining amount reference of the urea solution is less than a set value of the remaining amount of the urea solution, a first touch recognition pattern corresponding to the remaining amount reference of the urea solution and a second touch recognition pattern corresponding to a urea solution reinjection reference are individually generated; and
a vibration width of vibration transferred to a driver pressing a pedal pad is varied by controlling current supply to an eco motor provided in an accelerator pedal using an output signal according to the first touch recognition pattern, but pedal effort transferred to the driver pressing the pedal pad is further increased than a pedal effort size of a return spring by controlling current supply to the eco motor using an output signal according to the second touch recognition pattern.

14. The controller of claim 13, wherein the controller is a pedal controller for controlling the accelerator pedal.

15. The controller of claim 13, wherein the accelerator pedal is any one of a pendant type eco organ accelerator pedal, an adjustable eco organ accelerator pedal, and a box type organ accelerator pedal, realizing an eco mode through which the driver feels pedal effort different from that provided by the return spring.

16. A method for warning of a urea solution state using a touch, comprising:

performing urea solution check of analyzing urea solution detection information of a urea solution storage tank as a remaining amount of a urea solution in a pedal controller, and of setting a remaining amount reference of the urea solution by indicating the remaining amount of the urea solution as a percentage;
performing urea solution monitoring of not generating an output signal transferred to an accelerator pedal by the pedal controller when the remaining amount reference of the urea solution is greater than a set value of the remaining amount of the urea solution;
performing urea solution warning of, when the remaining amount reference of the urea solution is less than the set value of the remaining amount of the urea solution, individually generating a first touch recognition pattern corresponding to the remaining amount reference of the urea solution and a second touch recognition pattern corresponding to a urea solution reinjection reference by the pedal controller, and then of generating an output signal transferred to the accelerator pedal; and
performing a driver's recognition in which the driver recognizes a urea solution shortage state by transferring vibration generated by the accelerator pedal to the driver's foot through the first touch recognition pattern, and the driver recognizes a urea solution reinjection state by transferring pedal effort generated by the accelerator pedal to the driver's foot through the second touch recognition pattern.

17. The method of claim 16, wherein at the performing of the urea solution check, the remaining amount reference of the urea solution is a remaining amount of the urea solution <5%, and the urea solution detection information is updated at 1 minute interval.

18. The method of claim 16, wherein:
at the performing of the urea solution warning, the first touch recognition pattern is classified into a urea solution shortage mode and a urea solution warning mode, and a classification of the urea solution shortage mode and the urea solution warning mode is performed within a range of 0% <the remaining amount of the urea solution <5%; and
the urea solution reinjection reference is the remaining amount of the urea solution =0% or urea solution failure.

19. The method of claim 16, wherein at the performing of the driver's recognition, the recognition of the urea solution shortage state is performed such that the first touch recognition pattern is classified into a urea solution shortage mode and a urea solution warning mode within a range of 0% <the remaining amount of the urea solution <5%, and is performed by differing a vibration width of the urea solution shortage mode from that of the urea solution warning mode.

20. The method of claim 19, wherein a size of the vibration width is changed by applying vibration width=(10−the remaining amount of the urea solution %)*vibration time.

21. The method of claim 16, wherein at the performing of the driver's recognition, the recognition of the urea solution reinjection state is performed such that the size of the pedal effort is increased as the pedal effort is gradually increased over time, and the size of the pedal effort is changed on the basis of 1.0 kgf.

22. The method of claim 16, wherein at the performing of the driver's recognition, the recognition of the urea solution shortage state and the recognition of the urea solution reinjection state are visually or acoustically provided for the driver through a cluster forming the driver's seat.

* * * * *